United States Patent

Chou et al.

[11] 4,122,668
[45] Oct. 31, 1978

[54] IRIS CONTROL FOR GAS TURBINE ENGINE AIR BRAKE

[75] Inventors: Cheng-Chien Chou, Carmel, Ind.; Theodore L. Rosebrock, Rochester, Mich.

[73] Assignee: General Motors Corporation, Detroit, Mich.

[21] Appl. No.: 822,568

[22] Filed: Aug. 8, 1977

Related U.S. Application Data

[63] Continuation of Ser. No. 707,494, Jul. 22, 1976, abandoned.

[51] Int. Cl.² .............................................. F02C 7/02
[52] U.S. Cl. .............................. 60/39.16 R; 188/290; 251/212; 415/163
[58] Field of Search ................ 188/290, 296; 415/159, 415/166, 160, 163; 251/212; 60/39.16 R, 39.16 S, 39.16 C

[56] References Cited

U.S. PATENT DOCUMENTS

| | | | |
|---|---|---|---|
| 3,182,759 | 5/1965 | Kelemen | 188/296 X |
| 3,234,902 | 2/1966 | Booth | 60/39.16 R X |
| 3,378,117 | 4/1968 | Stacy | 188/264 A |
| 3,399,747 | 9/1968 | Westwell et al. | 188/296 |
| 3,982,390 | 9/1976 | Bell | 60/39.16 R |

FOREIGN PATENT DOCUMENTS

| | | | |
|---|---|---|---|
| 695,170 | 12/1930 | France | 251/212 |
| 1,147,940 | 6/1957 | France | 251/212 |

Primary Examiner—George E. A. Halvosa
Attorney, Agent, or Firm—John C. Evans

[57] ABSTRACT

A gas turbine engine of the two shaft free turbine type has a first gasifier turbine for driving a compressor to supply air to a combustor for combustion with fuel to produce motive fluid for driving the compressor turbine and a second free wheeling power turbine. An air brake with a compressor impeller directly coupled to the power turbine has an inlet and an exhaust and a close coupled iris throttle assembly for regulating the inlet flow of air into the compressor to obtain maximized power turn down ratios without aerodynamic instability.

4 Claims, 5 Drawing Figures

IRIS CONTROL FOR GAS TURBINE ENGINE AIR BRAKE

This is a continuation of application Ser. No. 707,494, filed July 22, 1976, now abandoned.

This invention relates to gas turbine engines and more particularly to two shaft automotive gas turbine engines having an air brake directly connected to the power turbine shaft of the engine and including control means for varying the air flow across a compressor impeller of the air brake during engine operation.

Two shaft automotive gas turbine engines of the type set forth in U.S. Pat. No. 3,680,983 issued Aug. 1, 1972, to Albert H. Bell, III are characterized as having only limited amount of engine braking in the power turbine stage. Accordingly, it is desirable to include an add-on device to the gas turbine engine directly connected or operatively coupled to the power turbine shaft to produce a desired additional engine braking action during vehicle deceleration. One such device is set forth in U.S. Pat. No. 3,817,343 issued June 18, 1974, to Albrecht. Such devices are only practical in automotive gas turbine engine applications if the parasitic power loss of the air brake system does not exceed a specified power limit and if the air brake compressor is aerodynamically stable when air flow to the compressor is throttled to reduce parasitic power loss.

Accordingly, an object of the present invention is to provide a two-shaft automotive gas turbine engine having an air brake with a centrifugal impeller directly connected to the power turbine shaft; the brake having an air inlet thereto and an air outlet and wherein a close coupled iris throttle assembly is located in the air brake inlet and regulated in accordance with engine operation to produce a high power turn down ratio when the iris throttle assembly is closed off and permitting only a limited air flow through the compressor without affecting its aerodynamic stability.

Another object of the present invention is to provide an improved air brake assembly adapted for direct connection to a power turbine of a two shaft gas turbine engine and wherein the air brake includes means for producing braking of the power turbine under vehicle deceleration conditions, said means including an improved iris throttle assembly to permit a large unrestricted air flow through the air brake under vehicle deceleration and to produce a restricted air flow across the air brake under normal vehicle operation without affecting the aerodynamic stability of an air brake compressor impeller.

Still another object of the present invention is to provide an improved air brake assembly for association with two shaft gas turbine engines and including a centrifugal impeller connected to a power turbine shaft and having highly forwardly turned blades at the exit of the centrifugal impeller and including an inlet having an iris throttle assembly therein with a plurality of circumferentially spaced iris vanes each having a first constant radius edge segment thereon positionable when the iris throttle assembly is closed in a close spaced relationship with a shaft extending coaxially of the inlet to the air brake and wherein each iris vane further includes a second curved segment thereon of a radius greater than the first segment and positionable during engine braking at a location radially outboard of a large diameter inlet flow passageway through the assembly for permitting a substantially unrestricted flow of air into the inlet to produce engine braking on the power shaft equivalent to that found in an internal combustion engine.

Yet another object of the present invention is to provide an improved inlet throttling device for an air brake assembly including a plurality of circumferentially located pivotally mounted iris vanes movable across the front planar extent of an annular inlet and each coupled to a rotational operator member located in close spaced parallellism with each of the vanes and operative to position the iris vanes in a flow throttling position and a full open position and wherein each of the vanes includes a first curved segment thereon of constant radius locatable in a full throttle position to form a narrow annulus in close spaced surrounding relationship to a shaft extending from the inlet and wherein each of the iris vanes further include a second curvilinear segment thereon of greater radius than the first mentioned segment to produce an unrestricted flow area when the vanes are in a full open position radially outwardly of the inlet during maximum braking and wherein the location of the individual iris vanes is closely adjacent the compressor inlet to prevent large changes in incident angle during throttling thereby to allow greater mass air flow reductions without stall; the narrow annulus formed during throttling also preventing the formation of strong tangential velocity gradients (wakes) downstream of the throttling device to reduce stress and vibration in an impeller component of the air brake.

Further objects and advantages of the present invention will be apparent from the following description, reference being had to the accompanying drawings wherein a preferred embodiment of the present invention is clearly shown.

Figure 1:
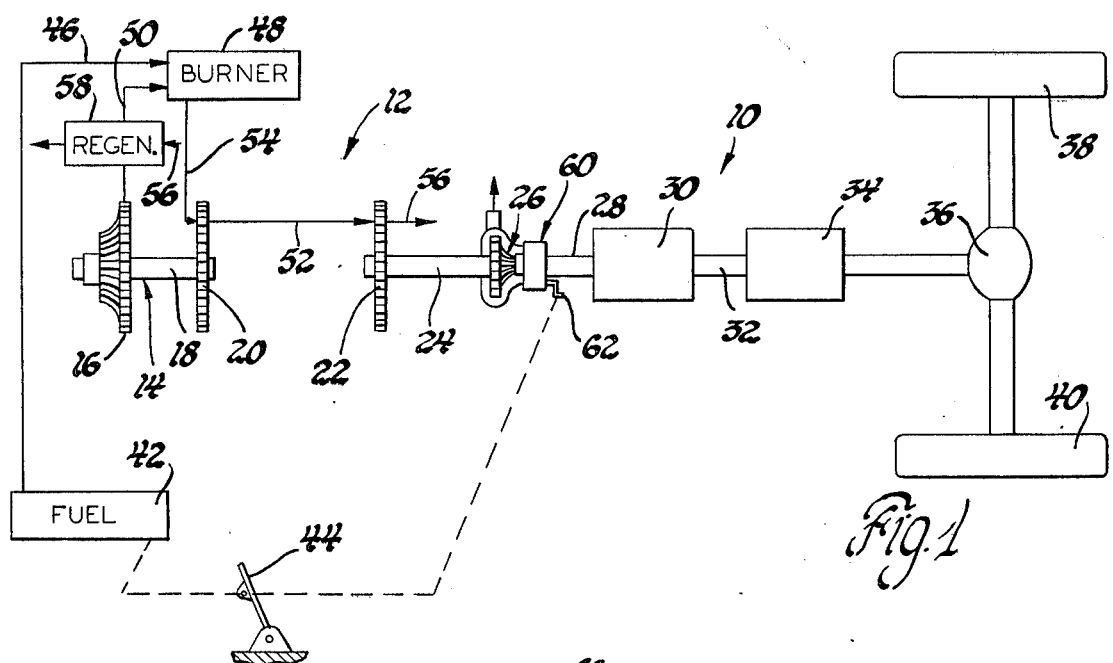
FIG. 1 is a diagrammatic view of a two shaft automotive gas turbine engine including the present invention.

Referring now to FIG. 1, a vehicle 10 is illustrated in diagrammatic form including a two shaft gas turbine engine 12 for powering the vehicle. The two shaft gas turbine engine 12 includes a gasifier spool 14 having a compressor 16 connected by a gasifier shaft 18 to a gasifier turbine 20. The engine 12 further includes a power turbine 22 connected to a free-wheeling power turbine output shaft 24 that is coupled to an air brake assembly 26 in accordance with the present invention, thence through an output shaft 28 and gear reduction unit 30 to a vehicle drive shaft 32 coupled to the input of a transmission 34 thence through a differential and rear axle assembly 36 to the drive wheels 38, 40 of the vehicle.

A fuel control 42 for the vehicle is under the control of an accelerator pedal 44. It supplies fuel through a line 46 to the burner 48 of the engine 12. The burner 48 also receives an air supply from a conduit 50 connected to the outlet of the gasifier compressor 16. Combustion products from the burner 48 are directed through outlets 52, 54 for driving the power turbine 22 and the gasifier turbine 20. In the illustrated arrangement the exhaust from the turbines 20, 22 is directed through a conduit 56 to a regenerator 58 for heating air from the gasifier compressor 16 prior to passage into burner 48.

The air brake system 26 includes a variable geometry iris throttle assembly 60 having a control input crank arm 62 coupled to the accelerator or throttle pedal 44 to control the operation of the air brake assembly 26 in accordance with accelerator position.

A representative form of fuel control operating in response to accelerator pedal position is set forth in U.S. Pat. No. 3,851,464 issued Dec. 3, 1974, to Davis et al. For purposes of the present invention it should be understood that a greater fuel supply is directed to the burner 48 during acceleration and a lesser fuel supply is directed thereto during deceleration. However, in motor vehicles driven by gas turbine engines such as the two shaft engine turbine 12 shown in FIG. 1, it is recognized that there is limited engine braking produced when the pedal 44 is moved to a decelerated position. The purpose of the air brake assembly 26 and iris throttle assembly 60 in FIG. 1 is to produce an engine braking of the vehicle 10 in the order of 36 horsepower at 32,000 rpm shaft speed of the output shaft 24. This is produced by the operation of the crank arm 62 by the accelerator pedal 44 as it moves to a deceleration position. Under normal vehicle operation, the crank arm 62 will condition the iris throttle assembly 60 to reduce the amount of air flow through the air brake assembly 26 so that power absorption therefrom will be much less than the power absorbed under braking conditions when the crank arm 62 conditions the assembly 60 in a run position to cause increased mass air flow through the air brake assembly 26. The iris assembly 60 may be infinitely variable in a part throttle range.

To be effective in an automotive vehicle application it is desired that the air brake assembly 26 function under vehicle deceleration or brake operation of the air brake assembly 26 to produce a braking characteristic or power absorption on the power turbine shaft 24 which is similar to the braking produced by a relatively large V-8 engine driving a typical automobile through an automatic transmission.

Figure 2:
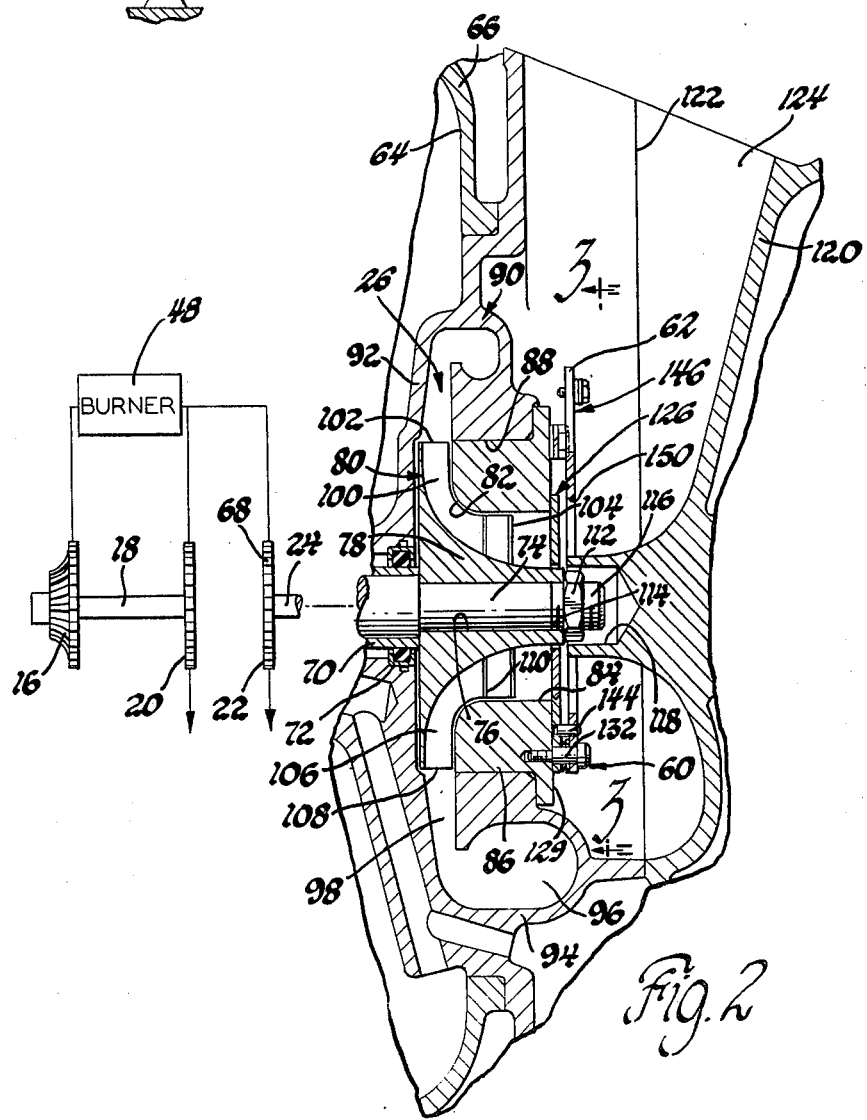
FIG. 2 is a fragmentary vertical sectional view of an air brake including an impeller and a close coupled on/off iris throttle assembly at the inlet to the impeller.

The air brake assembly 26 is configured to fit within an inboard, concave opening 64 formed in a rear bulkhead 66 of the engine 12 as shown in FIG. 2.

As seen in FIG. 2, the power turbine 22 includes a ring of axial flow blades 68 thereon located in an exhaust passage from the burner 48. The output shaft 24 extends from the turbine 22 and is supported by a bearing 70 in the rear bulkhead of the engine. A seal assembly 72 is located radially outwardly of the bearing 70 in the bulkhead 66 to seal against outboard leakage from the bulkhead 66. The shaft 24 includes an extension 74 therefrom press fit within a bore 76 of the hub 78 of an impeller 80 of the air brake assembly 26. The impeller 80 is located in a pump chamber 82 having an axial inlet 84 thereto defined by a shroud insert 86 supportingly received in a bore 88 through a pump case 90. The pump case 90 includes a rear wall 92 and a radially outwardly located portion 94 defining an annular diffuser chamber 96 in communication with a radial annular passage 98 in communication with the radially outer periphery of the impeller 80.

The impeller 80 preferably is a cast aluminum centrifugal impeller with individual circumferentially spaced blades 100 each highly turned at their exit in the direction of impeller rotation. Exit end 102 on each blade 100 thus faces in the direction of impeller rotation at a 66° discharge angle at the radial exit of each of the blades 100. Each blade 100 also includes an axially located inlet end 104 that is in the form of a conventional inducer segment. Intermediate each of the blades 100 is located a splitter blade 106 that includes a radially outwardly located exit end 108 thereon configured like the exit end 102. Each blade 106 also includes an axially located inlet end 110 located downstream of the inducer segment 104 of each of the full blades 100. In one working embodiment the geometry of impeller 80 includes an inducer hub diameter of 1.20 inches; an inducer tip diameter of 2.76 inches; an impeller tip diameter of 4.90 inches; and an impeller tip width of 0.390 inches. The impeller is thus configured to produce high specific work on mass air flow therethrough.

In the illustrated arrangement the impeller 80 is held in place on the shaft extension 74 by a retainer nut 112 secured to a threaded portion 114 of the shaft extension 74. Shaft extension 74 further includes an outboard end 116 directed through a bore 118 in a housing end plate 120 that is secured to the pump case 90 along a part line 122 to define an inlet air flow passage 124 in communication with the inlet 84 to the impeller 80.

The iris throttle assembly 60, as shown in FIGS. 2 through 5, includes three iris vanes 126 located at circumferentially located points on the outboard face 129 of the shroud insert 86. More particularly, each of the iris vanes 126 includes a circular hole 128 at a radially outwardly located end portion 130 thereon secured to the outboard face 129 by a shoulder screw 132 having its threaded end fastened to the insert 86 and having a smooth diameter portion thereon located within the hole 128 for supporting the vane 126 for free pivotal movement with respect to the insert 86. Each of the vanes has a free end 134 opposite the pivoted end 130 defining a throttle stop limit as will be discussed.

Figure 3:
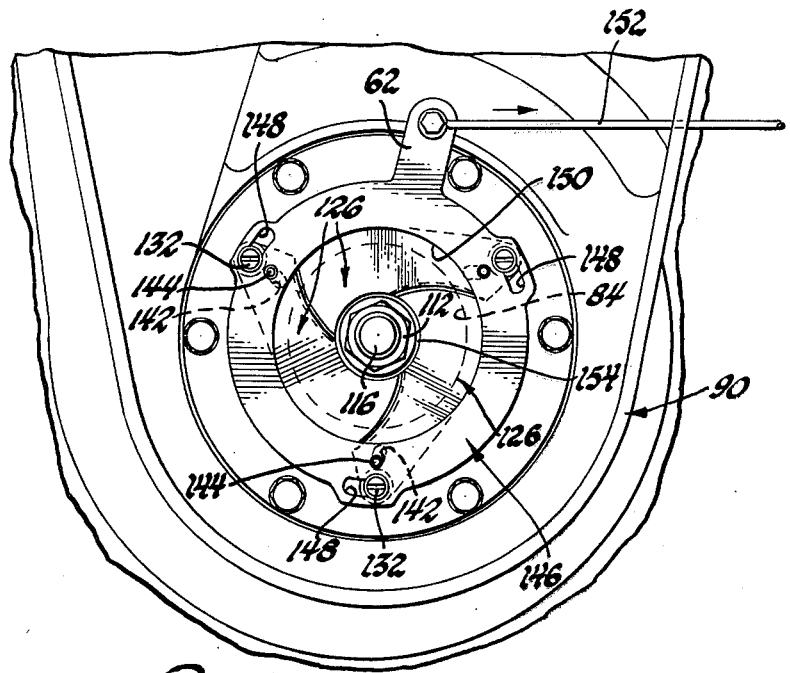
FIG. 3 is an end elevational view of the iris throttle assembly looking in the direction of the arrows of line 3—3 in FIG. 2.
Figure 4:
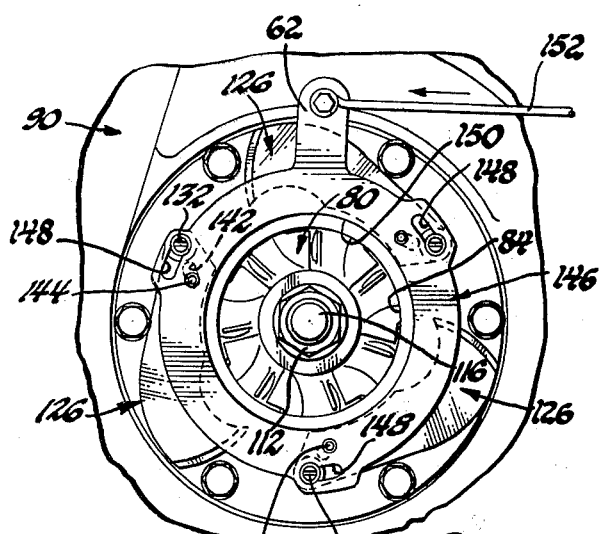
FIG. 4 is a view like FIG. 3 showing the iris throttle assembly in a full open position.
Figure 5:
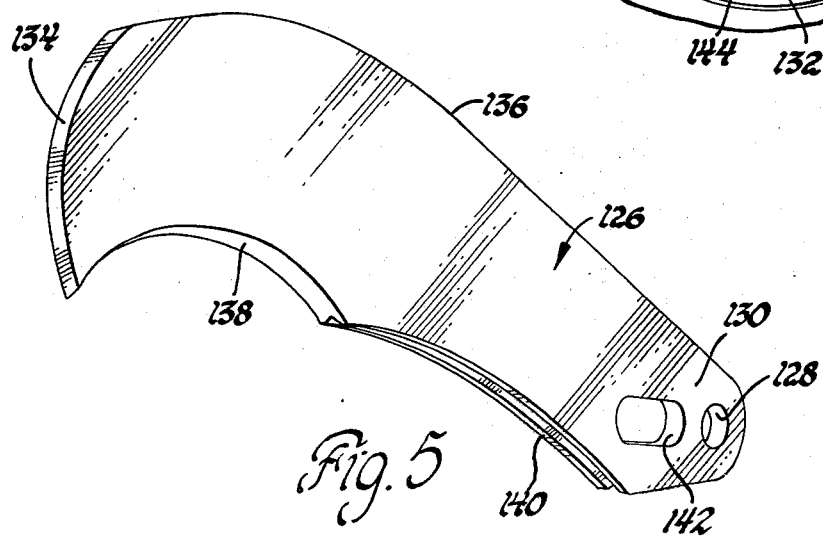
FIG. 5 is an enlarged, perspective view of an iris vane element of the iris throttle assembly.

The vanes 126 each have a radially outwardly directed edge 136 thereon extending from the free end 134 to the pivoted end 130. Additionally, each of the vanes 126 includes an inner orifice forming curved edge segment 138 thereon of a first constant radius intersecting the free end 134 and a second inner edge 140 that has a constant radius curvature greater than that of the curved edge segment 138. Each of the vanes 126 further includes an oval slot 142 located at the end 130 offset with respect to the circular hole 128 therethrough. A pin 144 extends into each of the slots 142 and is press fit through an iris control ring 146 extending completely circumferentially around and radially outwardly of the inlet 84 as best seen in FIGS. 3 and 4. The control ring 146 includes three slots 148 spaced circumferentially of and equidistantly with respect to one another around the outer perimeter of the ring 146. The shoulder of each of the screws 132 is directed through each slot 148 to center the inner edge 150 of the ring 146 with respect to the inlet 84. The crank arm 62 set forth above extends radially outwardly from the ring 146 and is tied to a control wire 152 that will rotate the ring 146 about the axis of the shaft extension 74 between a closed, flow throttling position and an open air flow position wherein a large mass of air flow is directed into the impeller 80 for producing an engine brake phase of operation.

The iris throttle assembly 60 is characterized by the component parts thereof being located closely adjacent inlet 84 between the insert 86 and the outer surface of the impeller hub 78. When the iris vanes 126 are positioned by the control ring 146 as shown in FIG. 3, each of the curved segments 138 is aligned into a round orifice configuration to define a narrow annular orifice between the hub and the individual vanes 126 for throttling air flow through the inlet 84. At this point each of the free ends 134 is located against the curved edge segment 140 of an adjacent vane 126 to define a throttle stop limit.

Since each of the vanes 126 is located closely adjacent and upstream of the inlet 84 large changes in rotor inducer incident angles during the throttling phase are prevented. This allows larger flow reduction, for example, through a narrow annular orifice as shown in FIG. 3 at 154, without impeller stall as compared to other forms of simple throttling devices.

Moreover, the round or nearly round orifice 154 that results when the segmented iris vanes 126 are in the throttle position of FIG. 3 avoids the formation of strong tangential velocity gradients or wakes to reduce impeller stress and vibration problems.

During the throttling mode of operation, the vehicle is driven at normal road speeds. At this time, as shown in FIG. 3, with an impeller 80 having the stated geometry and an operating speed of 32,000 rpm, air flow is throttled to 0.038 lbs/sec. This is accomplished without aerodynamic instability, i.e., stall conditions in the impeller 80. Additionally, limited air flow maintains minimized power losses during normal vehicle operation to avoid undesirable fuel economy.

When the vehicle is decelerated the accelerator pedal 44 is positioned to cause the control wire 152 to push against the ring 146 and rotate it about the axis of the shaft extension 74 counterclockwise from the position shown in FIG. 3. The pins 144 are carried by the ring 146 and they act against the slots 142 to cause the individual vanes 126 to pivot radially outwardly with respect to the inlet 84 about the pivot points defined by the shoulder screws 132. The vanes are configured to swing completely outwardly of the inlet 84 so that the inlet is completely open with the impeller 80 acting on the inlet air to draw large mass air flow for producing a brake action on the free power turbine 22. Under the open flow condition, in one working embodiment, brake horsepower on the order of 36 hp is applied to the power turbine shaft at 32,000 rpm, giving an engine braking equivalent of that found in similarly powered internal combustion engines under vehicle deceleration conditions. The parasitic losses under similar conditions are in the order of one horsepower, representing a turn-down ratio of 26 to 1.

By way of summary, a close coupled inlet iris throttle assembly 60 upstream of an impeller inlet has several advantages. Inlet air flow can be throttled to low pressure and high velocities. The impeller blade inducer is placed closely adjacent the low pressure and high velocity region before air has had a chance to expand to fill the flow passage upstream of the inducer. Accordingly, the high velocity air stream enters the inducer of the impeller 80 at favorable incident angles thereby to greatly reduce tendencies for aerodynamic stall.

The arrangement enables a controlled amount of air flow without unnecessarily increasing parasitic losses under engine run operation and will maintain air temperatures in the vicinity of the impeller 80 within reasonable limits during throttle operation. The iris throttle assembly is easily mounted with respect to the air brake impeller on the outboard end of a standard gas turbine engine block.

While the embodiments of the present invention as herein disclosed, constitute a preferred form, it is to be understood that other forms might be adopted.

The embodiments of the invention in which an exclusive property or privilege is claimed are defined as follows:

1. A flow controlled air brake assembly for braking a power shaft of a two shaft gas turbine engine comprising a turbine engine bulkhead, a power shaft extending through said bulkhead, a compressor case secured on said bulkhead having a pump chamber with an axial inlet and a radially located outlet, an air brake impeller located within said pump chamber secured to said shaft for rotation within said chamber, said impeller having blade means thereon to produce high specific work on air flow thereacross and an axially extending inlet hub surface, said blade means having an inlet inducer segment on said inlet hub surface, a plurality of iris vanes located circumferentially around said axial inlet, each of said vanes having a pivoted outer end and a free end, means for supporting said outer end on said case for pivotal movement of said vane with respect to said inlet, each of said vanes having a curved first edge segment thereon and a curved second edge segment thereon, control means for positioning said vanes in a maximum air throttle control position wherein each of said free ends engage a second edge segment to locate said first edge segments as a continuous circular edge, said first and second curved edge segments having an arcuate extent and radius to space said circular edge from said inlet hub surface to define an annular orifice opening around said inlet hub to produce limited mass air flow to the impeller to minimize power loss therefrom while maintaining flow of cooling air through the impeller, said annular orifice being located immediately axially upstream of said inlet inducer segment at a closely coupled distance so as to cause high velocity air streams downstream of said orifice to enter said inlet inducer segment before the air stream expands to fill the flow passage upstream of said inlet inducer thereby to reduce aerodynamic stall in said impeller at said limited mass air flow, said control means having a maximum brake control position wherein said vanes are swung completely radially outwardly of said inlet to define a large area annulus between said vanes and said inlet hub surface for unrestricted air flow into said impeller to produce increased power loss therefrom with resultant braking of said power shaft.

2. A flow throttle assembly for an air brake retarder for braking a power shaft of a two-shaft gas turbine engine the retarder including means defining a pump chamber with an axial inlet and a radially located outlet, and an air brake impeller located within said pump chamber secured to said shaft for rotation therewith, said impeller having an inlet inducer segment, said throttle assembly comprising: an inlet hub surface, housing means defining an axial inlet to the impeller around said inlet hub surface, a plurality of iris vanes located circumferentially around said inlet, each of said vanes having a pivoted outer end and a free end, each of said vanes lying in a plane perpendicular to the axis of said inlet at a point immediately upstream of said inlet, means for pivotally connecting each of said outer ends to said housing means, each of said vanes having a curved first edge segment thereon and a curved second edge segment thereon, control means for positioning said vanes in a maximum air throttle control position wherein each of said free ends engages a second edge segment to locate said first edge segments as a continuous circular edge, said first and second curved edge segments having an arcuate extent and radius to space said circular edge from said inlet hub surface to define an annular orifice opening around said inlet hub surface to produce limited mass air flow to the impeller to minimize power loss therefrom while maintaining flow of cooling air through the impeller, said annular orifice being located immediately axially upstream of said inlet inducer segment at a closely coupled distance so as to cause high velocity air streams downstream of said orifice to enter said inlet inducer segment before the air stream expands to fill the flow passage upstream of said inlet inducer thereby to reduce aerodynamic stall in said impeller at said limited mass air flow, said control means having a maximum brake control position wherein said vanes are swung completely radially outwardly of said inlet to define a large area annulus between said vanes and said hub surface for unrestricted air flow into said impeller to produce increased power loss therefrom with resultant braking of said power shaft portion.

3. A flow throttle assembly for an air brake retarder for braking a power shaft of a two shaft gas turbine engine the retarder including means defining a pump chamber with an axial inlet and a radially located outlet, and an air brake impeller located within said pump chamber secured to said shaft for rotation therewith, said impeller having an inlet inducer segment, said throttle assembly comprising: an inlet hub surface, a shroud insert defining an axial inlet to the impeller around said inlet hub surface, said insert having an outboard face, a plurality of iris vanes located circumferentially around said face, each having a pivoted outer end and a free end, each of said vanes lying in a plane parallel to said face at a point immediately upstream of said inlet, means for pivotally connecting each of said outer ends to said face, each of said vanes having a curved first edge segment thereon and a curved second edge segment thereon, control means for positioning said vanes in a maximum air throttle control position wherein each of said free ends engages a second edge segment to locate said first edge segments as a continuous circular edge, said first and second curved edge segments having an arcuate extend and radius to space said circular edge from said inlet hub surface to define an annular orifice opening around said inlet hub surface to produce limited mass air flow to the impeller to minimize power loss therefrom while maintaining flow of cooling air through the impeller, said annular orifice being located immediately axially upstream of said inlet inducer segment at a closely coupled distance so as to cause high velocity air streams downstream of said orifice to enter said inlet inducer segment before the air stream expands to fill the flow passage upstream of said inlet inducer thereby to reduce aerodynamic stall in said impeller at said limited mass air flow, said control means having a control position wherein said vanes are swung completely radially outwardly of said inlet to define a large area annulus between said vanes and said hub surface for unrestricted air flow into said impeller to produce increased power loss therefrom with resultant braking of said power shaft portion.

4. A flow throttle assembly for an air brake retarder for braking a power shaft of a two-shaft gas turbine engine the retarder including means defining a pump chamber with an axial inlet and a radially located outlet, and an air brake impeller located within said pump chamber secured to said shaft for rotation therewith, said impeller having an inlet inducer segment, said throttle assembly comprising: an inlet hub surface, a shroud insert defining an inlet to the impeller around said inlet hub surface, said insert having an outboard face, a plurality of iris vanes located circumferentially around said face, each of said vanes having a pivoted outer end and a free end, each of said vanes lying in a plane parallel to said face at a point immediately upstream of said inlet, means for pivotally connecting each of said outer ends to said face, each of said vanes having a curved first edge segment thereon and a curved second edge segment thereon, a control ring located upstream of each of said vanes, said ring having an inner edge located radially outwardly of said inlet, means for supporting said ring for rotation on said insert, means including a pin connected between each of said vanes and said control ring for positioning said vanes in a maximum air throttle control position wherein each of said free ends engages a second edge segment to locate said first edge segments as a circular edge, said first and second curved edge segments having an arcuate extent and radius to space said circular edge from said inlet hub surface to define an annular orifice opening around said inlet hub surface to produce limited mass air flow to the impeller to minimize power loss therefrom while maintaining flow of cooling air through the impeller, said annular orifice being located immediately axially upstream of said inlet inducer segment at a closely coupled distance so as to cause high velocity air streams downstream of said orifice to enter said inlet inducer segment before the air stream expands to fill the flow passage upstream of said inlet inducer thereby to reduce aerodynamic stall in said impeller at said limited mass air flow, said control means having a maximum brake control position wherein said vanes are swung completely radially outwardly of said inlet to define a large area annulus between said vanes and said inlet hub surface for unrestricted air flow into said impeller to produce increased power loss therefrom with resultant braking of said power shaft portion.

* * * * *